April 30, 1968     J. W. LEVEILLE     3,380,453
LIVESTOCK CERVICAL TUBE
Filed Oct. 22, 1965     2 Sheets-Sheet 1
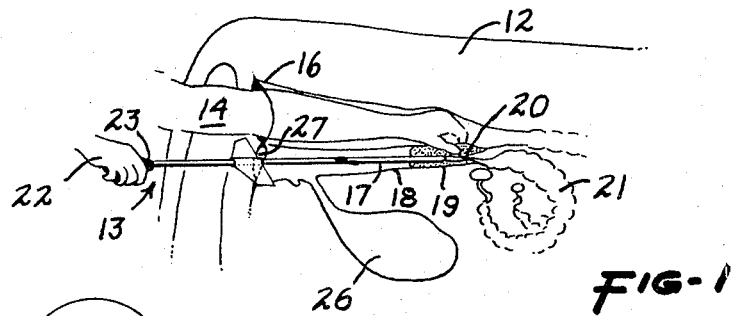
FIG-1
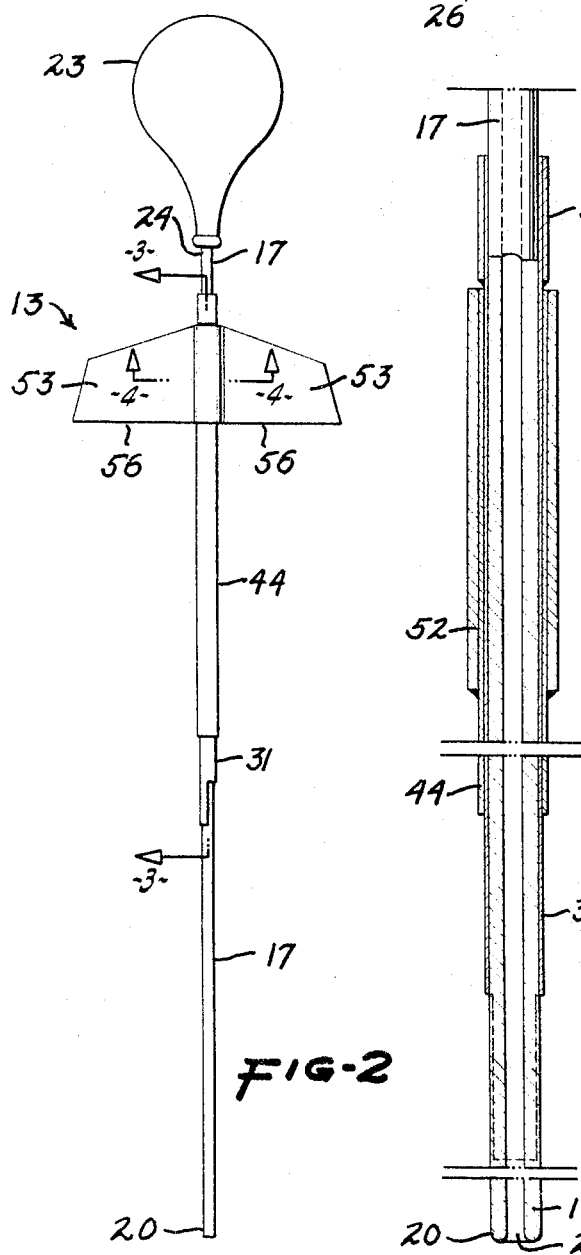
FIG-2    FIG-3
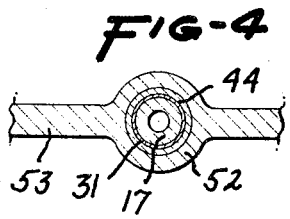
FIG-4
FIG-5
INVENTOR.
JAMES W. LEVEILLE
BY Lothrop & West
ATTORNEYS

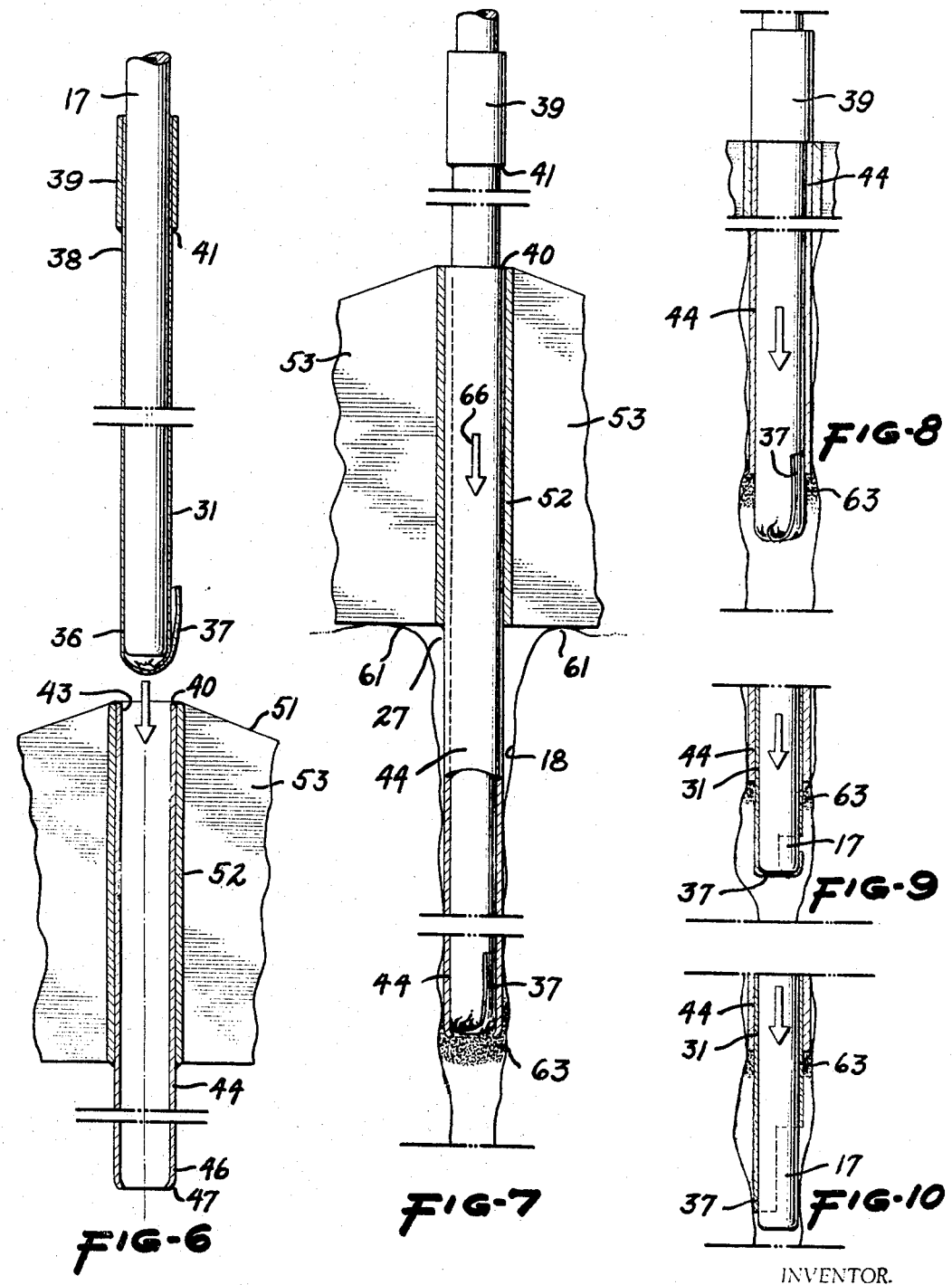

United States Patent Office 3,380,453
Patented Apr. 30, 1968

3,380,453
LIVESTOCK CERVICAL TUBE
James W. Leveille, Madera, Calif., assignor of fifty percent to Lester J. Gendron, Madera, Calif.
Filed Oct. 22, 1965, Ser. No. 502,124
3 Claims. (Cl. 128—260)

The invention relates to cervical tubes particularly used in connection with the artificial insemination of livestock, such as cows.

In improving the breed of livestock, such as cattle, artificial insemination is a well-established procedure. In general, the methods used involves the placement of preserved semen from a prize donor within the cervix of a cow. This is ordinarily accomplished by inserting a semen-filled tube through the cow's vagina and into the cervix, followed by ejecting the semen by the use of air pressure.

In the hands of skilled persons, the conception rate under the foregoing procedure is quite satisfactory. It has been found, however, that the presence of the usual mud, dirt and fecal matter adjacent the mouth of the vagina, serves as a contaminant source. Thus, regardless of how carefully the tube is inserted through this area into the vagina, small particles of the contaminant lodge on the distal end of the tube and are carried to the cervix. Infection and irritation of the reproductive system of the cow is an altogether too frequent result, thus leading to premature loss of the calf even if conception does occur.

It is therefore an object of the invention to provide a livestock cervical tube which minimizes the occurrences of premature loss.

It is another object of the invention to provide a sanitary cervical device which is readily adaptable for use with apparatus and procedures heretofore widely accepted and used.

It is yet another object of the invention to provide a sanitary device for use in connection with the artificial insemination of livestock which is highly economical and convenient to employ.

It is a further object of the invention to provide a livestock cervical tube, the proper use of which is readily learned by persons connected with the art of artificial insemination.

It is still a further object of the invention to provide a generally improved livestock cervical tube.

Other objects, together with the foregoing, are attained in the embodiment described in the following description and illustrated in the accompanying drawings in which:

FIG. 1 is a diagrammatic showing of certain of the reproductive organs of a cow, and illustrating the manner in which the cervical tube of the invention is used;

FIG. 2 is a side elevational view of the device, showing the tube in substantially fully projected position;

FIG. 3 is a fragmentary, longitudinal, sectional view to an enlarged scale, the plane of the section being indicated by the line 3—3 in FIG. 2;

FIG. 4 is a fragmentary, transverse, sectional view, to an enlarged scale, on the plane indicated by the line 4—4 in FIG. 2;

FIG. 5 is a fragmentary isometric view of the distal end of the thin, flexible sanitary slip cover;

FIG. 6 is a fragmentary, median, longitudinal, sectional view showing the tube with slip cover installed thereon preparatory to being inserted within the flanged guiding sleeve;

FIG. 7 is a view comparable in parts to that of FIG. 6, but showing the device partially inserted into the vagina, with the flanges abutting the vulva;

FIGS. 8–10 illustrate the sequence of steps following that appearing in FIG. 7, and are included to show how the sanitary flap on the distal end of the slip cover protects the tube against contamination, and how, upon reaching a predetermined location, the flap is unfolded to expose the distal end of the semen-filled tube preparatory to being ejected when the cervix is reached.

While the device of the invention is susceptible of numerous physical embodiments, depending upon the environment and requirements of use, numerous of the herein shown and described embodiments have been made, tested and used with exceptionally effective results in minimizing premature loss.

FIG. 1 shows a portion of the after end of a cow 12 being artificially inseminated by use of the cervical tube of the invention, generally designated by the reference numeral 13. In conventional manner, the rubber glove-covered left arm 14 of the breeder is inserted in the rectum 16 of the cow, helping to guide the tube 17 properly through the vagina 18 and to the cervix 19 where, by palpatation, the open distal end 20 of the tube is properly positioned adjacent the horns 21 of the uterus. The semen is thereupon ejected by squeezing with the right hand 22 on the air-bulb 23 located at the proximal end 24 of the tube. The cow's bladder 26 is connected to the vagina 18 and the outer end of the vagina terminates in a substantially vertically oriented opening, or vulva 27.

Being located below the rectum opening, the vulva is often covered with feces. Furthermore, this area is often frequently covered with dirt, mud, and other contaminants occasioned by the cow's lying on or rolling on the ground.

Insertion of tubes of the types heretofore made and used frequently led to carrying particles of the contaminants into the vagina and to the cervix. The presence of infectious or irritating material in the vagina is not particularly serious since there is a steady outward flow of a mucous substance through the vagina, sweeping out with it any such material. In the cervix area, however, there is no substantial outward flow of a cleansing substance. Consequently, the contaminants frequently cause infection or irritation, often leading to loss of the fetus.

I have therefore devised means for protecting or shielding the end of the cervical tube as it passes through the contaminated area adjacent the vulva.

The hollow cervical tube 17, previously referred to, is ordinarily of a plastic material and is often about eighteen inches long. The air bulb 23 on the proximal end of the tube serves not only to draw the prepared semen, usually preserved under refrigeration, upwardly, through the opening 29 and into the tube, but also to eject the semen at the appropriate time as stated above.

As a sanitary shield, I provide a slip cover 31 formed from a very thin, flexible, yet tough and moisture impervious material, such as polyethylene. The slip cover is tubular in configuration and has an inside diameter such that it fits with a degree of snugness on the outside of the cervical tube itself. The length of the sanitary slip cover is at least sufficient to extend several inches into the vagina, plus approximately two inches, or the axial length of a flange member 33, soon to be described in more detail.

The distal end 36 of the slip cover 31 is preferably formed with a cut-out portion to define a cover flap 37 (see FIGS. 5 and 6).

On the proximate end 38 of the slip cover is coaxially mounted a collar 39 of a somewhat more rigid material, the bottom of the collar 39 providing an annular shoulder 41.

In preparing the semen-filled tube 17 for use, the slip cover 31 is inserted over the tube and positioned with the flap 37 folded around the distal end of the tube as appears most clearly in FIG. 6.

At this juncture, the enclosed distal end of the tube 17, together with the sanitary slip cover, are inserted into the proximal end 43 of a hollow guide sleeve 44, the distal end 46 of the guide sleeve being circularly or annularly crimped, as at 47, to provide an inside diameter barely sufficient to pass the enclosed distal end of the tube. The crimped portion serves most conveniently as a tactile indicator that the enclosed distal end 20 of the tube has been inserted to its proper temporary location in the guide sleeve 44.

Mounted on the proximal end 43 of the guide sleeve 44 is a flange 51, or limit stop member conveniently formed with a tubular portion 52 coaxially mounted on the guide sleeve 44 and including a pair of transverse flanges 53, or wings, projecting in opposite directions, as appears most clearly in FIGS. 1 and 2.

The distal edges 56 of the flanges 53 are preferably co-linear and are especially adapted to abut against the flesh of the animal adjacent the vertically oriented vulva, the flanges being maintained in a generally horizontal attitude, as shown in FIG. 1. In other words, the bottom of the flanges serve as a limit stop inhibiting any additional inward movement of the guide sleeve to which the flanges are affixed.

In using the device, the enclosed distal end 20, covered by the flap 37, is first inserted in the guide sleeve 44, as previously explained, and temporarily bottomed against the annular crimping 47.

The device is then grasped by the user and, with the cow securely held, the distal end 46 of the guide sleeve 44, together with the enclosed distal end 20 of the tube located therein, are concurrently inserted through the vulva 27 and into the vagina 18 until stopped by the wings 53 as they abut the outer wall 61 of the vulva 27 (see FIG. 7).

At this juncture, the distal ends of the sleeve and the tube are well past the location of the main contaminated area adjacent the vulva. However, as appears most clearly in FIG. 7 there still remains a small pocket 63 of contaminants disposed at the distal ends of the tube and the guide sleeve.

In order to move the enclosed distal end 20 of the cervical tube beyond the pocket 63 of contaminated particles in a sanitary fashion, the proximal end of the tube only is pushed in the direction of the arrow 66. The guide sleeve is unable to move since it is stopped by the abutment of the wings 53 with the vulva wall.

As the cervical tube 17 and the enclosing slip cover 31 are translated, the enclosed leading tip of the tube, covered by the flap 37 moves past the annular crimping 47 to a position beyond the contaminated pocket 63, as appears most clearly in FIG. 8. At this juncture, the shoulder 41 of the slip cover collar 39 is bottomed against shoulder 40 at the proximal end of the guide sleeve, thus preventing further movement of the slip cover.

Then, as the tube continues to move, the flap 37 begins to unfold, as shown in FIG. 9, until, as appears most clearly in FIG. 10, the flap is pulled entirely free of the distal end of the tube, this occurring well after the contaminated pocket 63 is left behind. The tube end is therefore in a sanitary condition as it approaches the cervix.

As can be seen most clearly in FIG. 1, the distal end of the cervical tube is moved to its final position several inches beyond the location shown in FIG. 10. However, as described above, any external contaminants are left behind, with the result that when the semen is lodged in the cervix there are no sources of infection or irritation present. As a result, the premature losses heretofore encountered have been most favorably reduced.

By fabricating the slip cover and the guide sleeve structure of inexpensive material, these elements can be discarded after each insemination and new elements used each time.

It can therefore be seen that the use of this instrumentality provides a valuable adjunct to the art of artificial insemination of livestock and is of particular benefit to the cattle industry.

What is claimed is:

1. A cervical tube for the artificial insemination of cows comprising:
    (a) an elongated hollow tube of predetermined length to enable its distal end to reach the cervix of a cow;
    (b) a tube guiding member including an elongated sleeve having a diameter greater than the diameter of said tube, said sleeve being crimped at its distal end to a diameter capable of snugly passing said tube;
    (c) a pair of flanges mounted on the proximal end of said sleeve and projecting transversely therefrom in opposite directions; and,
    (d) a thin, flexible slip cover interposed between said tube and said sleeve, said slip cover having at its distal end a flap foldable over said distal end of said tube, and having on its proximal end a collar providing an annular shoulder engageable with the adjacent proximal end of said sleeve, said flap being unfoldable by movement of the distal end of said tube as said tube passes beyond said crimped distal end of said sleeve and said slip cover is positioned by the abutment between said collar and said proximal end of said sleeve.

2. The device of claim 1 wherein said slip cover is fabricated from polyethylene material.

3. A livestock cervical tube comprising:
    (a) an elongated hollow tube having a length sufficient to reach and deposit semen adjacent the cervix;
    (b) an elongated sleeve encompassing said tube for relative translational motion therebetween;
    (c) means on said sleeve for limiting the extent of vaginal penetration of said sleeve to a predetermined amount;
    (d) a thin flexible slip cover interposed between said tube and said sleeve, said slip cover including a flap at one end foldable over the penetrating end of said tube, said slip cover being translatable with said tube through said sleeve for a predetermined distance; and,
    (e) means for limiting the extent of translation of said slip cover to said predetermined distance, further translation of said tube being thereafter effective to unfold said flap and expose said penetrating end of said tube.

References Cited

UNITED STATES PATENTS

| 1,194,215 | 8/1916 | Morrison | 128—264 |
| 2,178,840 | 11/1939 | Lorenian | 128—260 |
| 2,572,155 | 10/1951 | Hoyt | 128—260 XR |
| 2,619,087 | 11/1952 | Oclassen et al. | 128—261 |
| 3,050,060 | 8/1962 | Hoffman | 128—260 |

FOREIGN PATENTS

| 469,951 | 1/1929 | Germany. |

L. W. TRAPP, *Primary Examiner.*